(12) United States Patent
Oguchi

(10) Patent No.: US 7,679,793 B2
(45) Date of Patent: Mar. 16, 2010

(54) IMAGE READING DEVICE AND MULTIFUNCTION MACHINE

(75) Inventor: Satoshi Oguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 11/807,063

(22) Filed: May 25, 2007

(65) Prior Publication Data

US 2007/0273937 A1  Nov. 29, 2007

(30) Foreign Application Priority Data

May 25, 2006 (JP) .............................. 2006-145230

(51) Int. Cl.
*H04N 1/04* (2006.01)
(52) U.S. Cl. ........................ 358/487; 358/475; 358/497; 358/474
(58) Field of Classification Search ................. 358/487, 358/506, 475, 509, 474, 505, 497; 348/96–98; 355/67, 68, 40, 41, 75; 399/211, 212, 378, 399/379, 380; 250/234–236, 239, 216; 382/312, 382/318, 319
See application file for complete search history.

(56) References Cited

U.S. PATENT DOCUMENTS

| 5,251,072 | A | * | 10/1993 | Fukuoka et al. ............. 359/896 |
| 5,986,774 | A | * | 11/1999 | Han ............................ 358/487 |
| 7,027,194 | B2 | * | 4/2006 | Kanda ........................ 358/496 |
| 7,119,934 | B2 | | 10/2006 | Yoshida et al. |
| 7,218,426 | B2 | * | 5/2007 | Sugano ....................... 358/475 |
| 7,235,769 | B2 | | 6/2007 | Uemura |
| 2002/0121590 | A1 | | 9/2002 | Yoshida et al. |
| 2005/0157354 | A1 | | 7/2005 | Ishida et al. |

FOREIGN PATENT DOCUMENTS

| JP | 04-029267 U | 3/1992 |
| JP | 04-261261 A | 9/1992 |
| JP | 10-051596 | 2/1998 |
| JP | 10-304105 A | 11/1998 |
| JP | 10-308851 A | 11/1998 |
| JP | 2002-077539 A | 3/2002 |
| JP | 2003-075944 A | 3/2003 |
| JP | 2003-158612 A | 5/2003 |
| JP | 2005-210287 A | 8/2005 |

\* cited by examiner

*Primary Examiner*—Cheukfan Lee
(74) *Attorney, Agent, or Firm*—Nutter McClennen & Fish LLP; John J. Penny, Jr.

(57) ABSTRACT

An image reading device is provided equipped with a first light source provided at the same side of a pickup device with respect to a manuscript table and a second light source provided at the opposite side of the pickup device with respect to the manuscript table. The image recording device includes a light shielding member provided at a first position at which light introduced to the manuscript table from the second light source is shielded or a second position different from the first position in a selectable manner, a coupling mechanism for coupling a light source moving mechanism for moving the second light source and a pickup device moving mechanism for moving the pickup device so as to be able to be engaged by a single driving source, and a blocking member provided to the light shielding member so as to block the coupling provided by the coupling mechanism when the light shielding member is provided at the first position.

8 Claims, 16 Drawing Sheets

IMAGE READING DEVICE AND MULTIFUNCTION MACHINE

The entire disclosure of Japanese Patent Application No. 2006-145230, filed May 25, 2006 is expressly incorporated by reference herein.

BACKGROUND

1. Technical Field

The present invention relates to an image reading device and a multifunction machine.

2. Related Art

Heretofore, there exists an image reading device equipped with a transmission type scanning mechanism for scanning the light emitted from a transmission light source provided to the opposite side of a pickup device with respect to a manuscript table and transmitted through a manuscript in addition to a reflection type scanning mechanism for scanning the light emitted from a reflection light source provided at the same side of the pickup device with respect to the manuscript table for holding a manuscript and reflected by a manuscript. In such an image reading device, there is an image reading device for reading a manuscript image while moving the light source and the pickup device in a scanning direction at the same time (for example, see JP-A-10-51596 (hereinafter, referred to as Patent Document 1)).

However, according to Patent Document 1 described above, two driving sources are required when moving the pickup device and the transmission light source oppositely disposed with the manuscript table interposed therebetween by using the driving force applied from respectively independent driving sources when reading a transmission type manuscript. Accordingly, there is a problem in that the size of the image reading device is enlarged and the power consumption thereof is increased.

At the same time, the pickup device and the light source may be engaged by a single driving source by coupling the pickup device and a moving mechanism which moves the transmission light source. However, in this case, the transmission light source which is not used when reading a reflection type manuscript always moves in conjunction with the movement of the pickup device. Accordingly, there is a problem in that a large load is unnecessarily applied to the driving source, which unnecessarily requires large power consumption.

In dealing with the problem, user may perform ON/OFF switching operation in accordance with the type of the manuscript to be read. However, such an operation is bothersome to the user. Further, there is a problem in that a possibility of malfunction caused by user's operation error may exist.

SUMMARY

An image reading device according to an aspect of the invention is equipped with a first light source provided at the same side of a pickup device with respect to a manuscript table and a second light source provided at the opposite side of the pickup device with respect to the manuscript table. The image recording device includes a light shielding member provided at a first position at which light introduced to the manuscript table from the second light source is shielded or a second position different from the first position in a selectable manner, a coupling mechanism for coupling a light source moving mechanism for moving the second light source and a pickup device moving mechanism for moving the pickup device so as to be able to be engaged by a single driving source, and a blocking member provided to the light shielding member so as to block the coupling provided by the coupling mechanism when the light shielding member is provided at the first position.

Thus, according to the aspect of the invention, the image reading device can be downsized as compared with the case where driving sources are provided to each of the light source moving mechanism and the pickup device moving mechanism. Further, the coupling provided by the coupling mechanism is blocked by providing the blocking member to the first position without providing any special operation by user for blocking the transmission of the driving force to the light source moving mechanism. Therefore, the power consumption of the driving source can be reduced to the minimum necessary without sacrificing the convenience of the user.

Further, it is preferable that the image reading device according to the aspect of the invention further include a cover member, the cover member having a shape to shield outside light introduced into the pickup device through the manuscript table, which can freely contact with and separate from the manuscript table. The light shielding member is provided so as to be freely attached to and detached from the cover member.

Accordingly, since the blocking member is provided so as to be freely attached to and detached from the cover member, a manuscript can be changed by only contacting and separating the cover member with the light shielding member attached to the cover member. In addition, the power consumption of the driving source can be reduced to the minimum necessary without sacrificing the convenience of the user while providing the downsizing of the image reading device.

Further, it is preferable that the blocking member is provided to the light shielding member at a position which allows blocking the coupling provided by the coupling mechanism when the light shielding member is attached to the cover member.

Therefore, in the image reading device according to the aspect of the invention, the blocking member can be positioned to the position which allows blocking of the coupling provided by the coupling mechanism only by attaching the light shielding member to the cover member. Accordingly, user can reduce the power consumption of the driving source to the minimum necessary while providing the downsizing of the image reading device only by attaching the light shielding member to the cover member without particularly concerning the position of the blocking member.

Further, it is preferable that the blocking member has a shape to press a portion of the coupling mechanism projected from the cover member into the cover member when the light shielding member is attached to the cover member.

Therefore, according to the aspect of the invention, the power consumption of the driving source can be reduced to the minimum necessary without sacrificing the convenience of the user while providing the downsizing of the image reading device. In addition, a reflection type manuscript can be scanned without damaging the reflection type manuscript by the portion of the coupling mechanism projecting from the cover member.

Further, it is preferable that the light shielding member has a shape to hold down a manuscript to the manuscript table.

Therefore, according to the aspect of the invention, a position of a manuscript with respect to the manuscript table can be fixed by holding down the manuscript with the light shielding member. In addition, the power consumption of the driving source can be reduced to the minimum necessary without sacrificing the convenience of the user while providing the downsizing of the image reading device.

Further, it is preferable that the second light source is provided to the cover member.

Accordingly, as the second light source is provided to the cover member, the second light source can be disposed to an appropriate position only by covering the manuscript table with the cover member. In addition, the power consumption of the driving source can be reduced to the minimum necessary without sacrificing the convenience of the user while providing the downsizing of the image reading device.

Further, it is preferable that the second light source is constituted by an LED.

Accordingly, quick lighting can be realized as compared with the case where a fluorescent light is used and quick starting of reading a manuscript can be realized. In addition, the power consumption of the driving source can be reduced to the minimum necessary without sacrificing the convenience of the user while providing the downsizing of the image reading device.

Further, a multifunction machine according to an aspect of the invention includes the image reading device described above and an image forming device for forming an image on a recording medium according to intensity of light introduced into the pickup device equipped in the image reading device.

Accordingly, the power consumption of the driving source can be reduced to the minimum necessary without sacrificing the convenience of the user while providing the downsizing of the image scanning mechanism of the multifunction machine.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a preferable first embodiment of an image reading device according to the invention will be described in detail with reference to the accompanying drawings. The first embodiment shows an example applied to a scanner device providing the image reading device according to the invention.

Figure 1:
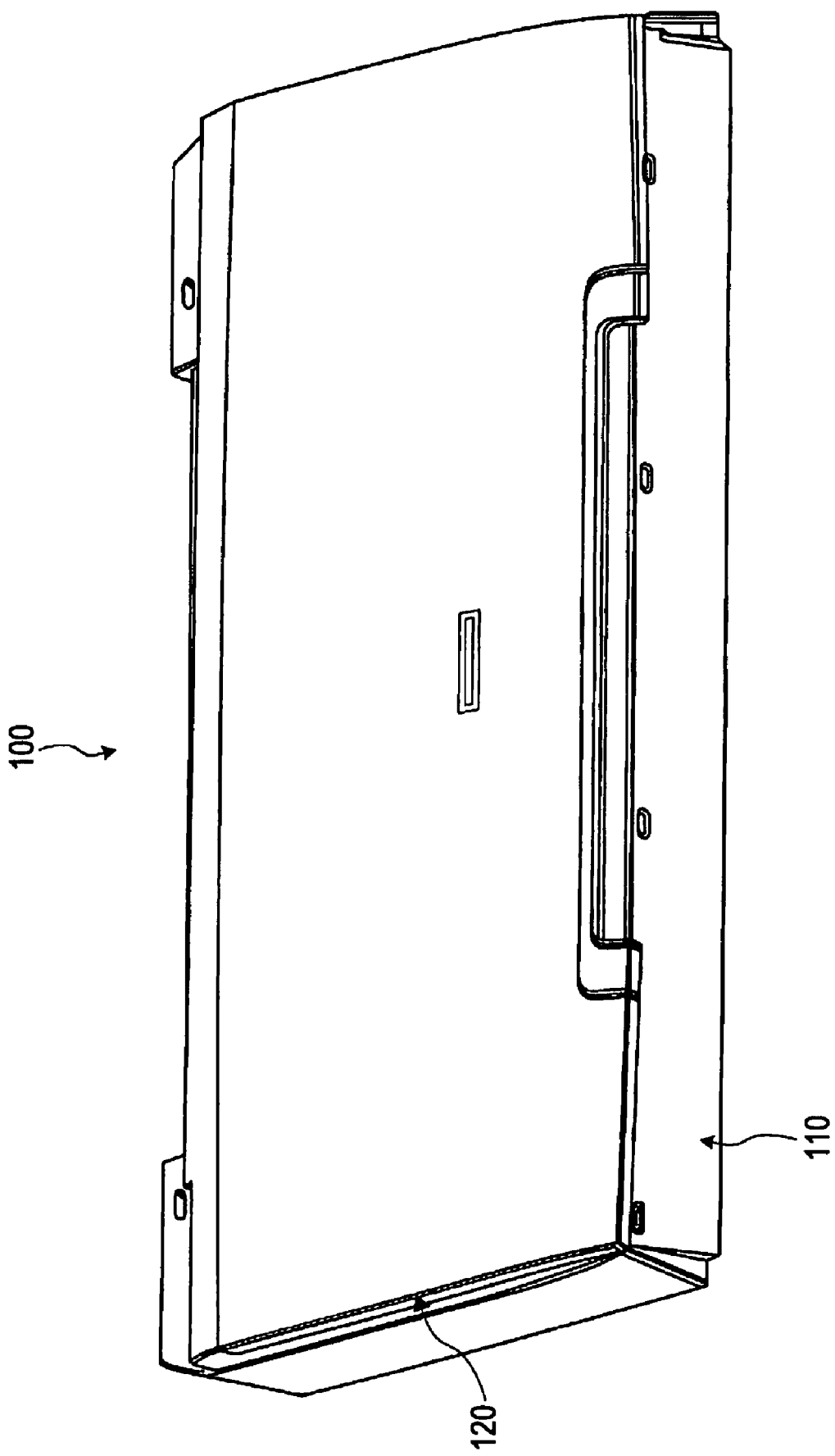
FIG. 1 is a perspective view showing an appearance of a scanner device according to a first embodiment.

FIG. 1 is a perspective view showing an appearance of a scanner device 100 according to the first embodiment. First, the appearance of the scanner device 100 according to the first embodiment will be described. As shown in FIG. 1, the scanner device 100 includes a main body unit 110 and a transmission type manuscript light source unit 120 (hereinafter, referred to as "TPU unit") as a cover member.

Figure 3:
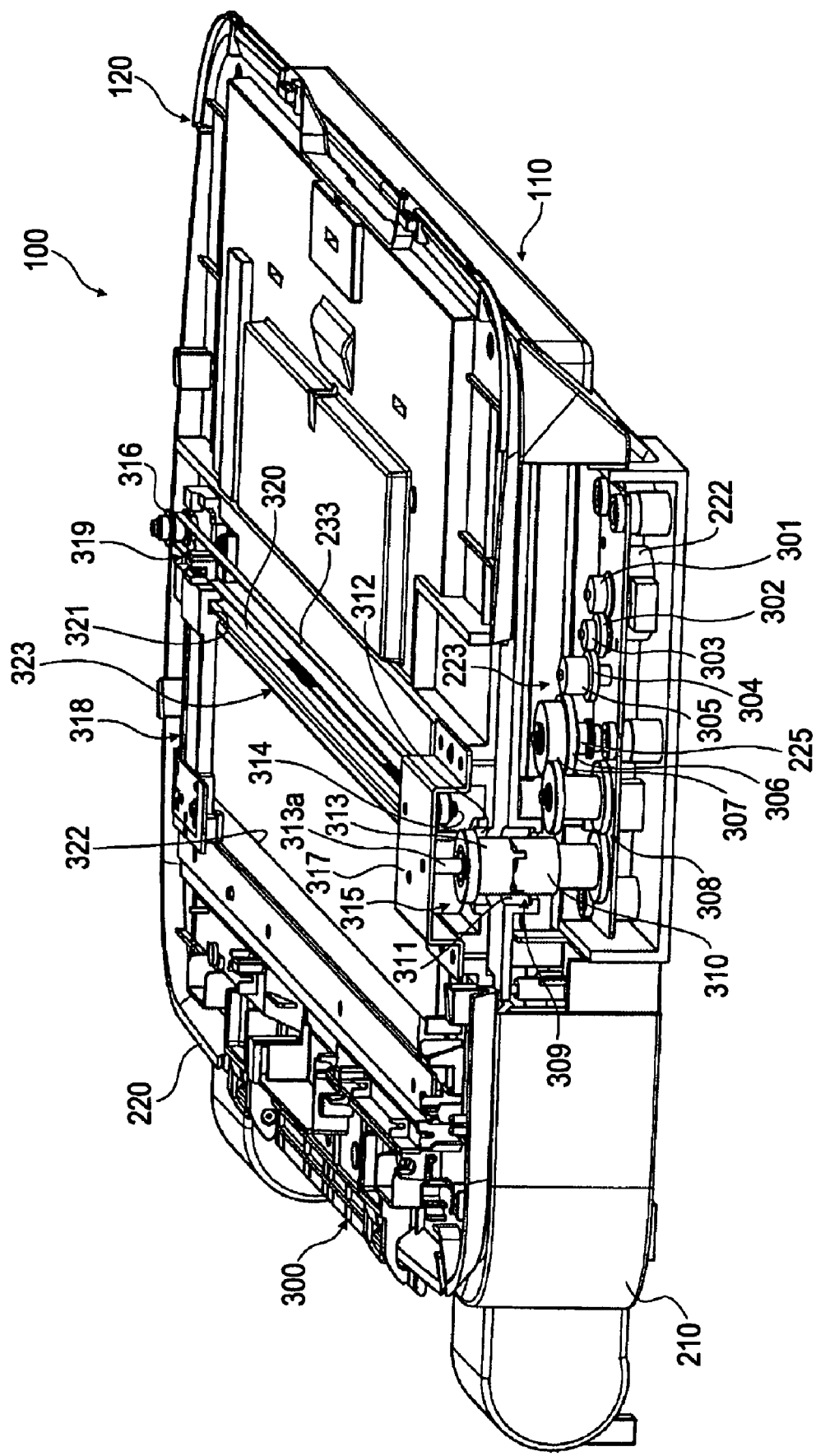
FIG. 3 is a perspective view, partially cross sectional view, of the scanner device.

The TPU unit 120 is oppositely disposed to the main body unit 110 and coupled to the main body unit 110 via a hinge portion (see FIG. 3). The TPU unit 120 is coupled to the main body unit 110 in a rotatable manner in the direction so as to be apart therefrom from the state shown in FIG. 1 with the hinge portion as a supporting point (see FIGS. 7 and 8).

Figure 2:
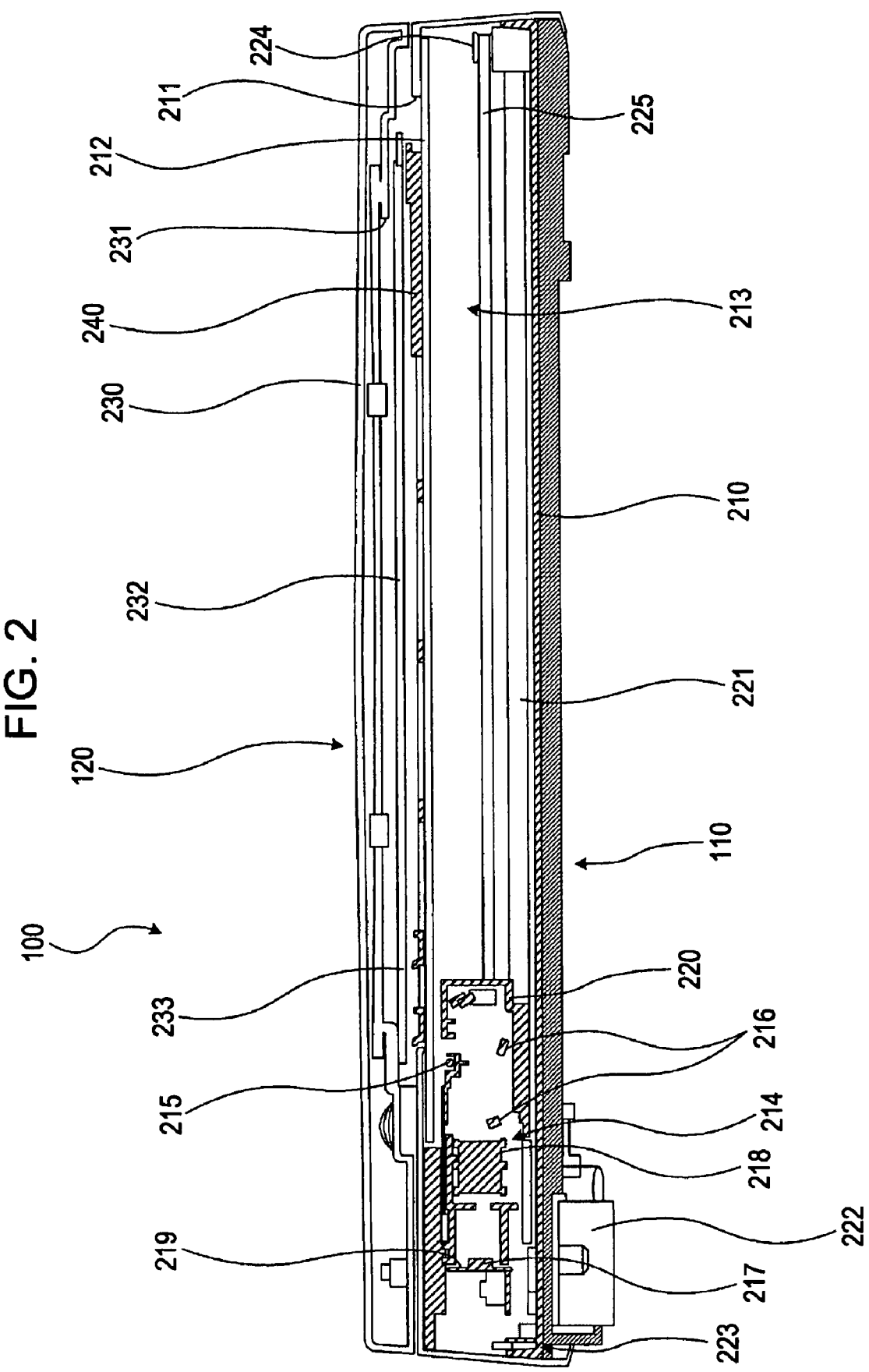
FIG. 2 is a longitudinal front view of the scanner device according to the first embodiment.

FIG. 2 is a longitudinal front view of the scanner device 100 according to the first embodiment. Then, a structure of the scanner device 100 according to the first embodiment will be schematically described. As shown in FIG. 2, the scanner device 100 includes a main body housing 210 constituting the outline of the main body unit 110 and a TPU housing 230 constituting the outline of the TPU unit 120.

First, a structure of the main body unit 110 will be schematically described. The main body housing 210 of the main body unit 110 includes an opening 211 opened toward the TPU housing 230. A manuscript table glass 212 is provided to the opening 211 so as to block the opening 211.

An optical member 214 for optically reading a manuscript placed on the manuscript table glass 212 is provided in a space 213 formed by the main body housing 210 and the manuscript table glass 212. The optical member 214 is constituted by a reflection light source 215 for emitting light toward the manuscript table glass 212, a plurality of mirrors 216 for introducing the light emitted from the reflection light source 215 and reflected by a manuscript toward a predetermined pathway, a pickup device 217 for receiving the light introduced by the mirrors 216, a lens 218 for focusing the light introduced by the mirror 216 on the pickup device 217, and the like.

As for the pickup device 217, for example, a photodiode photoelectrically converting an image focused on the acceptance surface and outputting an electronic signal corresponding to a receiving amount for each element can be used. For the scanner device 100, a linier image sensor in which the photodiodes described above are arranged in a straight manner along a main scanning direction on a scanning circuit substrate 219 is used as for the pickup device 217.

Further, a scanner carriage 220 is provided in the space 213. The scanner carriage 220 is provided parallel to the manuscript table glass 212 and is slidably provided along a carriage guide 221 extending in a sub scanning direction.

The driving force generated by a motor 222 as a power source is transmitted to the scanner carriage 220 via a pickup device moving mechanism 223 coupled to the motor 222. Although the detail will be described below, the pickup element moving mechanism 223 is coupled by a gear line coupled to the driving axis of the motor 222, a driving belt 225 wound between the gear constituting the gear line and a driven gear 224, and the like (see FIG. 3). The scanner carriage 220 is coupled to the driving belt 225.

The scanner carriage 220 moves in the sub scanning direction along the manuscript table glass 212 by transmitting the driving force generated by the motor 222 via the pickup device moving mechanism 223. The optical member 214 described above is mounted on the scanner carriage 220. The optical member 214 moves in the sub scanning direction along the manuscript table glass 212 with the movement of the scanner carriage 220.

Next, the TPU unit 120 will be described. A transmission light source section (see FIG. 3) as a light source is provided in the TPU unit 120 at the position which enables emitting light on a manuscript. The TPU unit 120 also functions as a light shielding member for shielding outside light introduced to the manuscript table glass 212 when scanning a transmission type manuscript described below and as a manuscript holding down member for holding down a manuscript with respect to the manuscript table glass 212. In addition, the TPU unit 120 also functions as a protection mat and a positioning member for determining the position of a blocking member described below by attaching a protection mat described below.

A constitution of the TPU unit 120 will be schematically described. An opening 231 opened toward the main body housing 210 is provided in the TPU housing 230 of the TPU unit 120 at the side opposing the main body housing 210.

A transmission light source section (see FIG. 3) as a light source is provided in the TPU housing 230. The transmission light source section 318 is used at the scanning operation of a manuscript of transmission type (hereinafter, referred to as "transmission type manuscript") such as a photographic film and emits light toward the manuscript table glass 212. The transmission light source section is provided so that it can be moved in the sub scanning direction along the manuscript table glass 212.

A power transmission mechanism (see FIG. 3) for transmitting the driving force of the motor 222 described above to the transmission light source section is provided in the TPU housing 230. Although detailed drawing and description are omitted, the power transmission mechanism provided in the TPU unit 120 is constituted by, for example, a pulley group coupled to the pickup device moving mechanism 223, a driving belt 233, and a pair of gear around which the driving belt 233 is wound, and the like (see the portion of FIG. 3).

A film holder 240 is set on the manuscript table glass 212, that is, between the main body unit 110 and the TPU unit 120 at the scanning operation of a transmission type manuscript. The film holder 240 is a member for guiding the setting position of the film so that the film can be set on a reading position for the film on the manuscript table glass 212 and for fixing the set film to the reading position.

A protection mat 232 having a shape to cover the whole opening 231 of the TPU housing 230 is provided so as to be freely attached and detached as a light shielding member at the scanning operation of a manuscript of an optical reflection type (hereinafter, referred to as "reflection type manuscript") such as a paper.

The protection mat 232 is formed by a non-transparent material and holds down a manuscript to the manuscript table glass 212 and shut out the light emitted from the light source except the reflection light source 215 (transmission light source section and outside light) to the manuscript. Herewith, the light emitted from the reflection light source 215 to the manuscript can be effectively reflected to the mirrors 216.

The protection mat 232 is provided between the TPU unit 120 and the manuscript table glass 212 and, for example, provided so as to be freely attached to and detached from the main body housing 210 side of the TPU housing 230. On the other hand, the protection mat 232 is detached when the scanner device 100 reads a transparent type manuscript. In this case, the light emitted from the transmission light source section transmits the transmission type manuscript and imaged on the light receiving surface of the pickup device 217.

Figure 8:
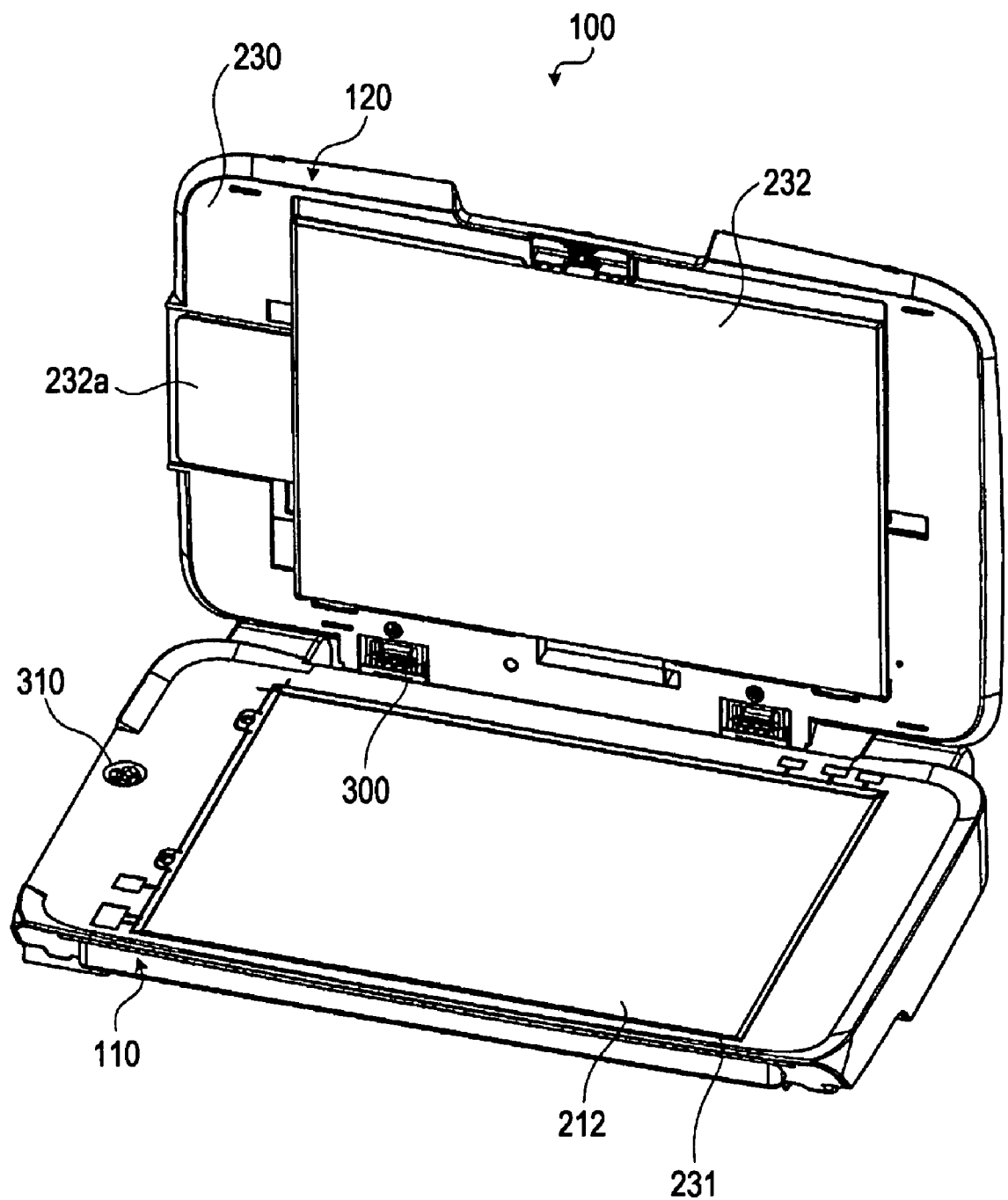
FIG. 8 is a perspective view showing an appearance of the scanner device when the protection mat is attached.

A blocking member 232a is provided to the protection mat 232 (see FIG. 8). The blocking member 232a blocks the coupling between the pickup device moving mechanism 223 and the light moving mechanism by a coupling mechanism described below. Further, the blocking member 232a has a shape to push a portion of the coupling mechanism projecting from the TPU housing 230 into the TPU housing 230. Herewith, the manuscript is prevented from being damaged by the projecting portion of the coupling mechanism even when the reflection type manuscript is reached to the coupling mechanism portion, for example, when reading a large manuscript.

The case in which the protection mat 232 is constituted so as to be detached from the scanner device 100 is described here. However, the protection mat 232 may be constituted so that it can be removed from between the TPU unit 120 and the manuscript table glass 212 without detaching from the scanner device 100. For example, a coupling section with the scanner device 100 may be provided to an end of the protection mat 232 to remove the protection mat 232 from between the TPU unit 120 and the manuscript table glass 212 without detaching the protection mat 232 from the scammer device 100.

FIG. 3 is a perspective view, partially cross sectional view, showing the scanner device 100. In FIG. 3, a state in which a part of the TPU housing 230 and the main body housing 210 is shown in a cross sectional manner. Reference numeral 300 in FIG. 3 denotes a hinge section for coupling the main body unit 110 and the TPU unit 120. Hereinafter, each element to which the driving force of the motor 222 is transmitted will be described with reference to FIG. 3.

As shown in FIG. 3, the pickup device moving mechanism 223 provided to the main body housing 210 is constituted by a gear 301 fixed to the driving axis of the motor 222 and a gear line 302 to 306 coupled to the gear 301. A gear around which the driving belt 225 described above is wound is provided to the axis which becomes the rotation axis center of the gear 306.

The pickup device moving mechanism 223 rotates the driving belt 225 by transmitting the driving force generated by the motor 222 to the driving belt 225 via the gears 301 to 306. Herewith, the scanner carriage 220 coupled to the driving belt 225 can be moved along the sub scanning direction.

In addition, a pulley 307 whose rotation axis center is the axis which becomes the rotation axis center of the gear 306 is provided. A gear 310 constituting a coupling mechanism 309 is coupled to the pulley 307 via a plurality of pulley groups 308 which rotate with the rotation of the pulley 307. The gear 310 constitutes the coupling mechanism 309 by engaging with a gear 313 provided at the side of the TPU unit 120 via openings 311 and 312 opened toward the side of the TPU unit 120 on the upper surface of the main body housing 210.

A pulley group 315 for coupling a gear 314 being one of the pair of the gear around which the driving belt 233 described above is wound and a gear 313 is provided in the TPU housing 230. The other gear 316 of the pair of gear rotates with the rotation of the driving belt 233. The gear 314 and the gear 316 are oppositely disposed along the sub scanning direction. Here, a light source moving mechanism 323 is constituted by the driving belt 233, the gears 314 and 316 constituting the pair of gear, and the pulley group 315.

The reference numeral 317 in FIG. 3 denotes a stay for supporting the axes of the gear 313, the pulleys constituting the pulley group 315, the gear 314, and the like. The gear 313 is slidably provided to an axis 313a supported by the stay 317. Herewith, the gear 313 can be engaged with the gear 310 in a separable manner. In addition, the gear 313 is prevented from escaping to the side of the stay 317 from the axis 313a by the stay 317. On the other hand, the gear 313 is constituted so as to be prevented from escaping to the gear 310 side from the axis 313a by an escape prevention mechanism not shown when the main body unit 110 and the TPU unit 120 are separated.

In addition, when the TPU unit 120 is lowered to the main body unit 110, the gear 313 falls down to the gear 310 by the force of gravity and engages with the gear 310. Herewith, when the TPU unit 120 is lowered to the main body unit 110 and a blocking member 232a described below is absence between the gear 310 and the gear 313, the gear 313 and the gear 310 become engaged state at all time. Here, although omitted in the drawing, the gear 313 may be biased in the direction of the gear 310 by providing a spring between the gear 313 and the stay 317. Herewith, the gear 310 and the gear 313 can be engaged more surely.

The reference numeral 318 in FIG. 3 shows the transmission light source section described above. The transmission light source section 318 is coupled to the driving belt 233 at a fixing portion 319 provided in the transmission light source section 318. Herewith, the transmission light source section 318 moves along the sub scanning direction with the rotation of the driving belt 233.

A guide rail 320 extending along the sub scanning direction is provided in the TPU housing at the side of the driving belt 233 and at the overlapped position of the movement locus of the transmission light source section 318. A groove 321 provided in the transmission light source section 318 at the position opposing the guide rail 320 is set in the guide rail 320. Herewith, the transmission light source section 318 can be stably moved in the sub scanning direction.

The light emitted from the transmission light source section 318 is introduced to the side of the manuscript table glass 212 through the opening provided in the TPU housing 230. An opening 322 is provided so as to cover the scanning range of a film among the transmission light source section 318.

Figure 4:
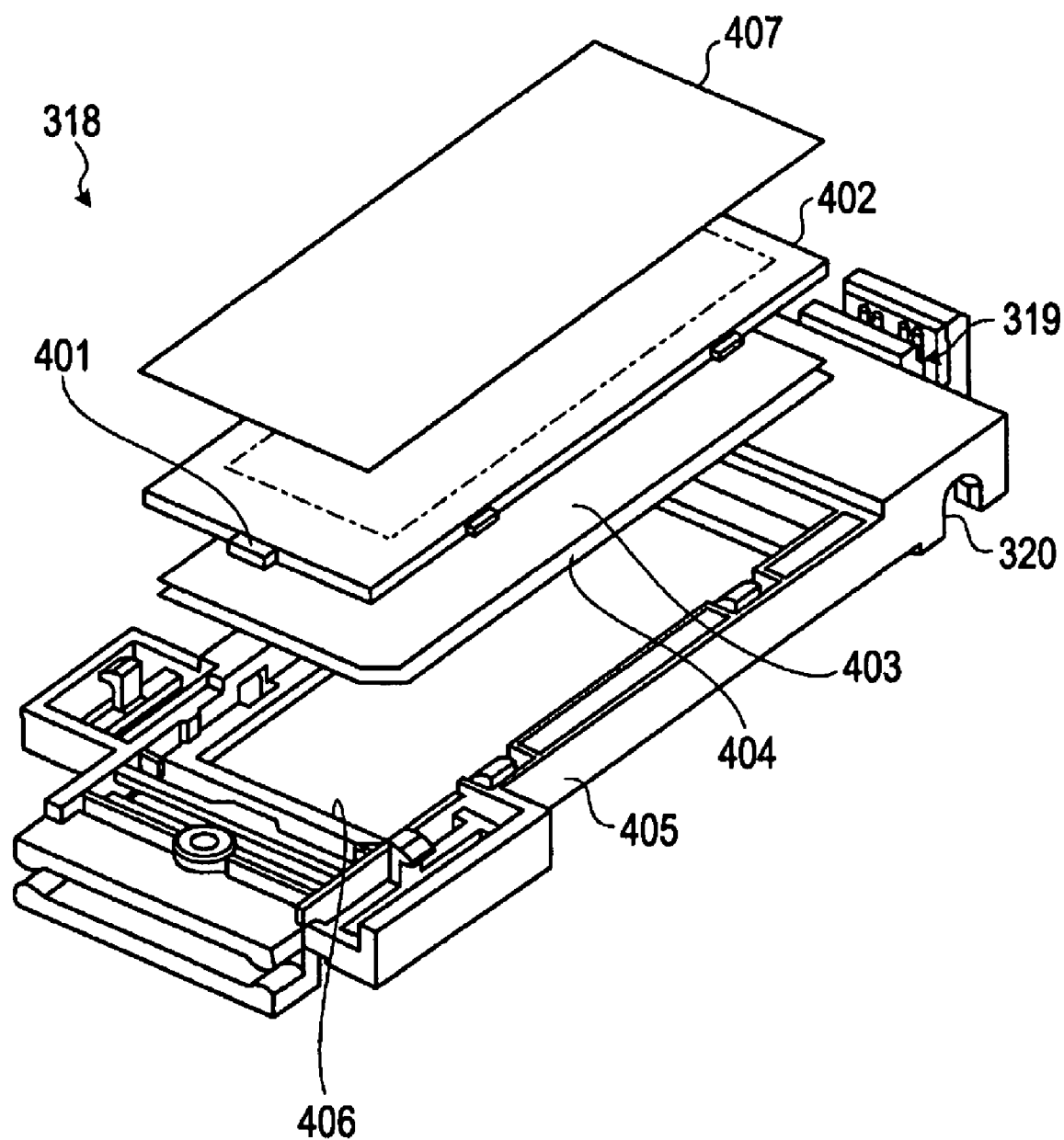
FIG. 4 is an exploded perspective view showing a transmission light source section.

FIG. 4 is an exploded perspective view showing the transmission light source section 318. Then, the structure of the transmission light source section 318 will be described. As show in FIG. 4, the transmission light source section 318 includes an LED 401 and a light guide plate 402 for diffusing the light emitted by the LED 401. An area larger than the emission area per one LED can be emitted with the light guide plate 402. Note that the virtual line expressed in the light guide plate 402 in FIG. 4 shows the effective emission area of the light guide plate 402.

The light diffused in the light guide plate 402 is emitted toward the manuscript table glass 212 from an opening 406 provided in a supporting frame 405 through a prism sheet 403 and a diffusing sheet 404. The light diffused in the light guide plate 402 can be emitted to a larger area by passing though the prism sheet 403 and the diffusing sheet 404.

In the transmission light source section 318, a reflection plate 407 for reflecting the light diffused in the light guide plate 402 toward the opening 406 is provided at the side opposite to the opening 406 with the light guide plate 402 interposed therebetween. By providing the reflection plate 407, the light diffused in the light guide plate 402 can be efficiently emitted to the side of the manuscript table glass 212.

The fixing portion 319 described above is provided at the side of the supporting flame 405 and is opened toward upside so as to sandwich the driving belt 233 from the side of the manuscript table glass 212. Note that, the transmission light source section 318 can be constituted by using a fluorescent light instead of the LED 401. However, quick lighting can be realized by using the LED 401, which allows quick scanning operation by the scanner device 100.

Figure 5:
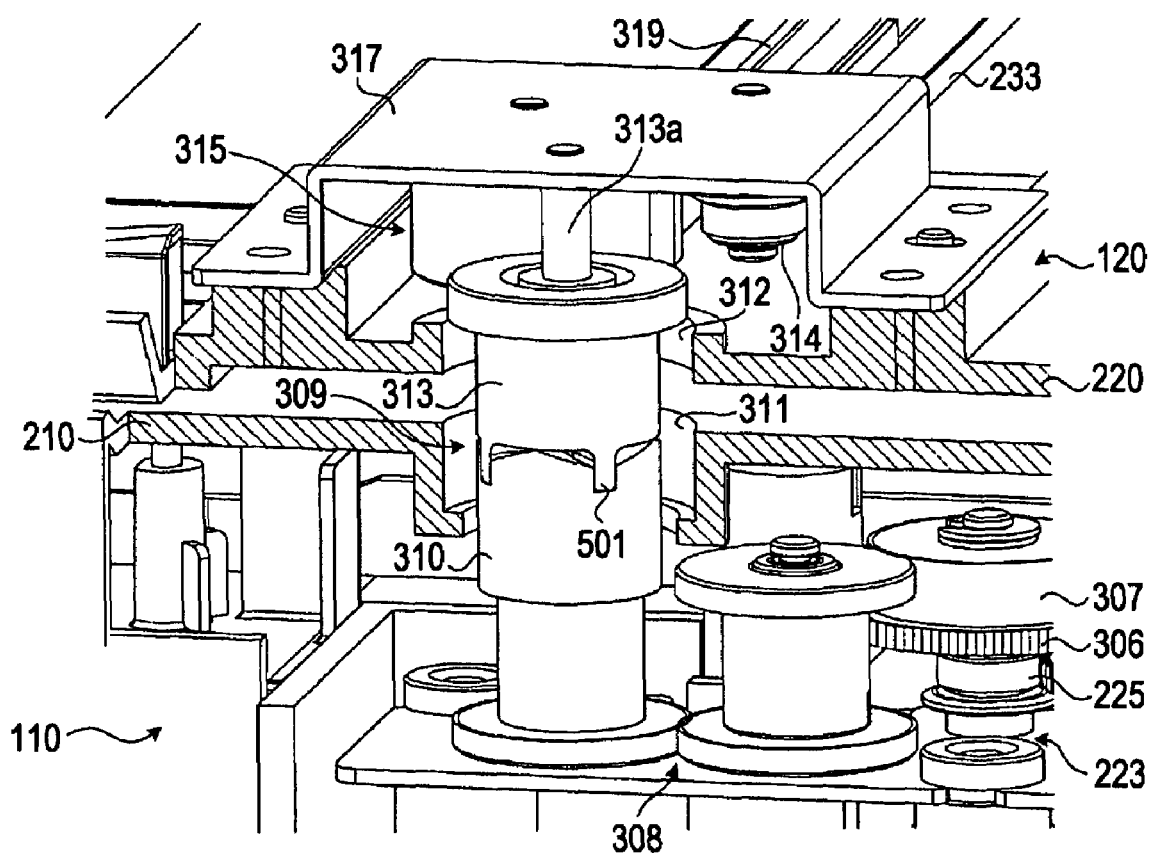
FIG. 5 is an enlarged perspective view (No. 1) showing a coupling mechanism.
Figure 6:
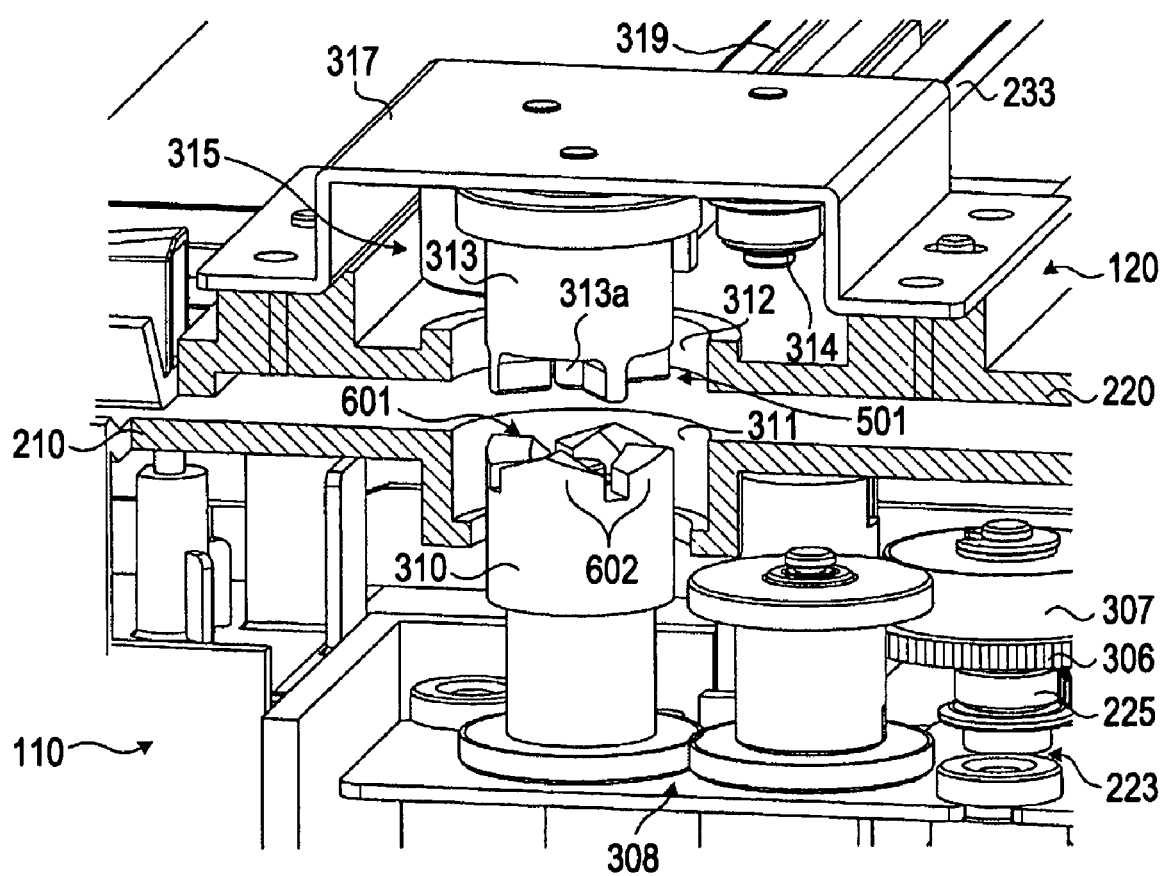
FIG. 6 is an enlarged perspective view (No. 2) showing the coupling mechanism.

FIG. 5 is an enlarged cross sectional view showing the coupling mechanism 309 (No. 1), FIG. 6 is an enlarged cross sectional view showing the coupling mechanism 309 (No. 2). FIG. 5 shows the state where the gear 310 and the gear 313 are engaged. FIG. 6 shows the state where the gear 310 and the gear 313 are separated. Not that, the gear 313 is essentially made contact with the gear 310 by the force of gravity (by biasing force of the spring when the spring is provided between the gear 313 and the stay 317) to be engaged with the gear 310. However, the state where the gear 310 and the gear 313 are separated is shown for the sake of convenience in FIG. 6.

As is understood from FIGS. 5 and 6, gear teeth 501 each projecting toward the main body unit 110 are provided in the gear 313 of the coupling mechanism 309. On the other hand, concave portions 601 with which the gear teeth 501 are engaged are formed in the gear 310 of the coupling mechanism 309. Each of the upper portions of ribs 602 forming the concave portion 601 has a mountain shape projecting to the side of the gear 313. The level of the projection becomes large as a portion of the mountain shape becomes the center. Herewith, the gear teeth 501 can be introduced into the concave portions 601 such that the gear 310 and the gear 313 are smoothly engaged with each other.

Figure 7:
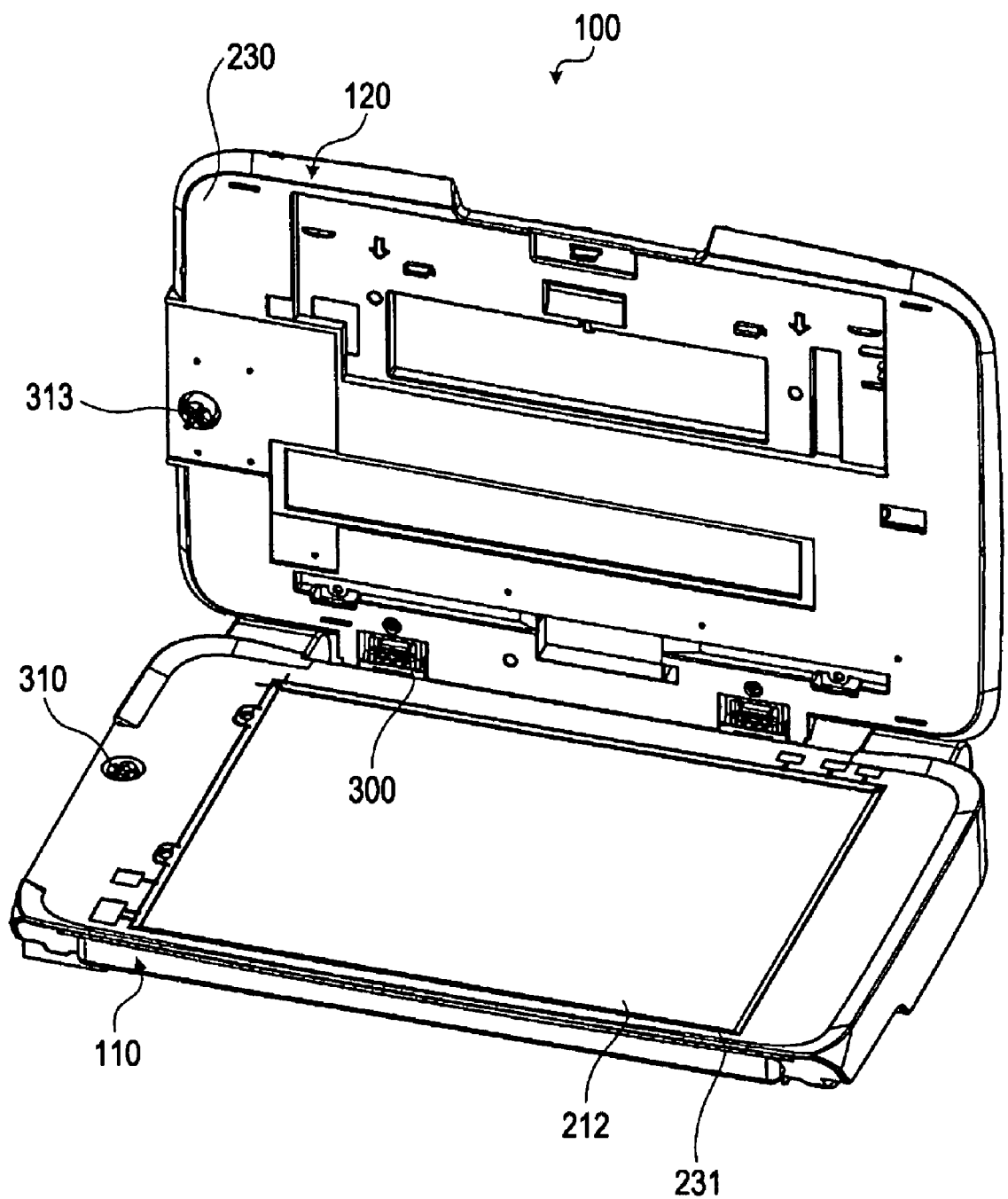
FIG. 7 is a perspective view showing an appearance of the scanner device when a protection mat is detached.

FIG. 7 is a cross sectional view showing an appearance of the scanner device 100 when the protection mat 232 is detached. FIG. 8 is a cross sectional view showing an appearance of the scanner device 100 when the protection mat 232 is attached. As is understood from FIG. 7, when the protection mat 232 is detached from the TPU housing 230, the gear 313 constituting the coupling mechanism 309 (see FIG. 3) is exposed from the TPU housings 230. When the TPU unit 120 is lowered to the main body unit 110 in this state, the gear 310 and the gear 313 are engaged with each other and the driving force of the motor 222 is transmitted (see FIG. 9) to the transmission light source section 318 (see FIG. 3).

On the other hand, as is understood from FIG. 8, when the protection mat 232 is attached to the TPU housing 230, the gear 313 is covered over by the blocking member 232a provided to the protection mat 232. When the TPU unit 120 is lowered to the main body unit 110 in this state, the gear 310 and the gear 313 are not engaged with each other and the driving force is not transmitted to the transmission light source section 318 even when the motor 222 is driven (see FIG. 10).

Figure 9:
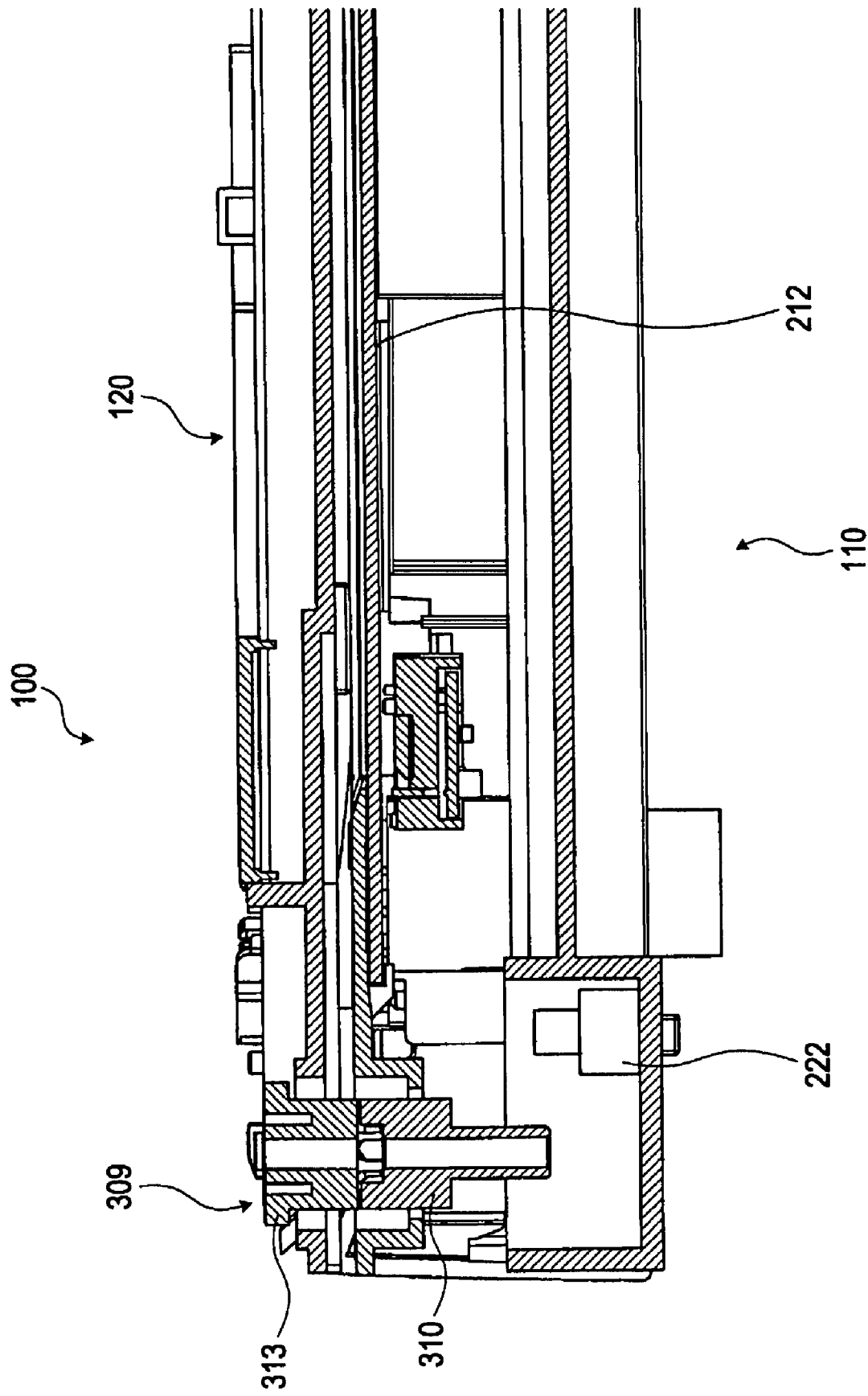
FIG. 9 is an enlarged longitudinal front view showing the scanner device when the protection mat is detached.
Figure 10:
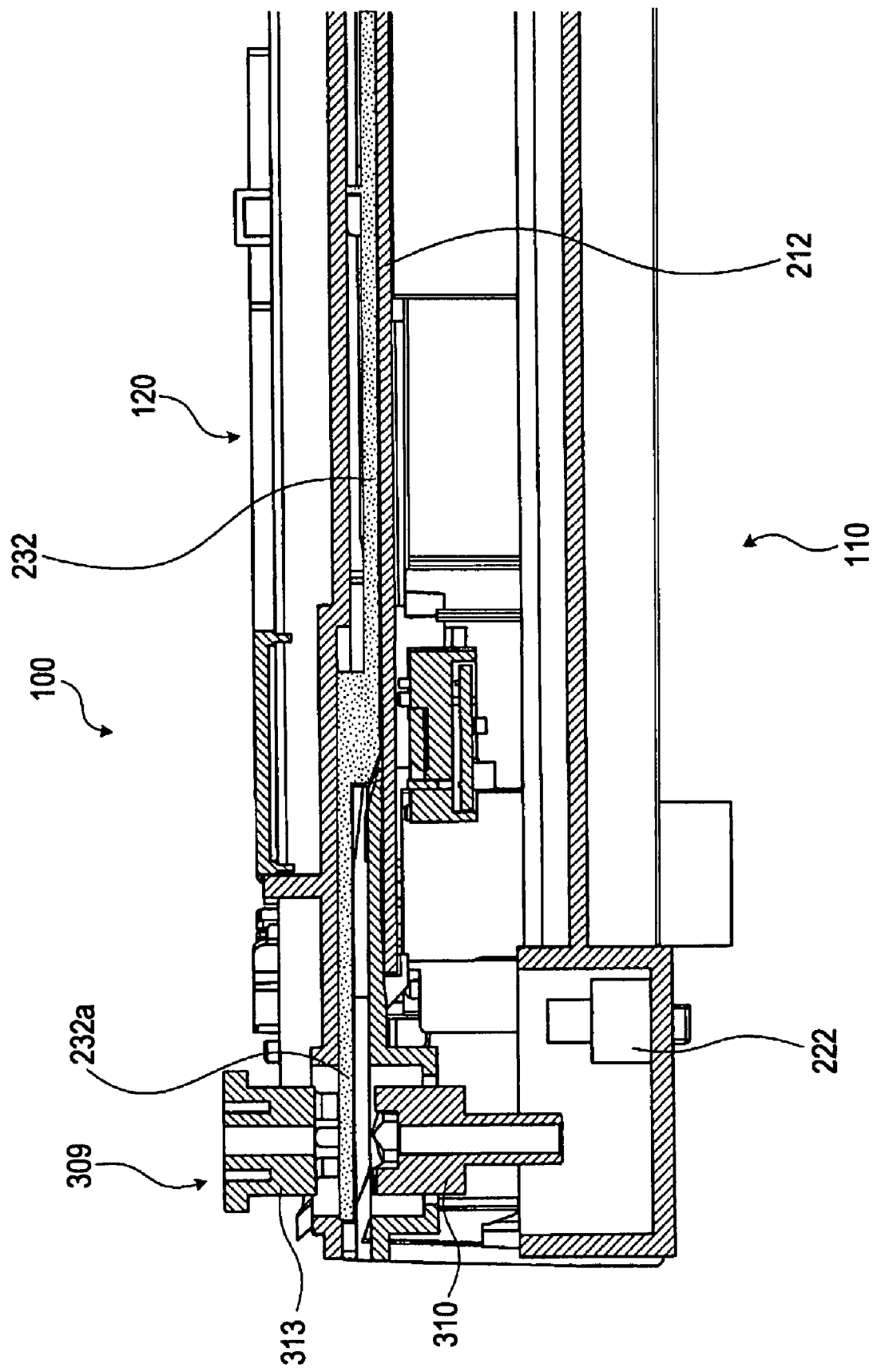
FIG. 10 is an enlarged longitudinal front view showing the scanner device when the protection mat is attached.

FIG. 9 is an enlarged longitudinal front view showing the scanner device 100 when the protection mat 232 is detached and FIG. 10 is an enlarged longitudinal front view showing the scanner device 100 when the protection mat 232 is attached. FIGS. 9 and 10 show the state when the TPU unit 120 is lowered to the main body unit 110. As is understood from FIGS. 9 and 10, when the TPU unit 120 is lowered to the main body unit 110, the gear 310 and gear 313 constituting the coupling mechanism 309 engage with each other when the protection mat 232 is detached from the TPU housing 230, but the gear 310 and gear 313 does not engage with each other by the blocking member 232a provided to the protection mat 232 when the protection mat 232 is attached to the TPU housing 230.

Although omitted in the drawings, the scanner device 100 is equipped with an operation panel for receiving various command operations by user, various control circuits for driving and controlling each section of the scanner device 100, a control system for controlling the various control circuits in accordance with the command operation received by the operation panel, and the like. The operation panel receives command operation for receiving a reflection type manuscript, command operation for receiving a transmission type manuscript, and the like.

In addition, although omitted in the drawings, the scanner device 100 may be equipped with a communication I/F for performing communication between an external device such as a personal computer. In this case, the scanner device 100 receives the command information according to the command operation received by the personal computer via the communication I/F.

The scanner device 100, for example, moves the scanner carriage 220 in accordance with the command operation received via the operation panel and the command information received via the communication I/F, turns on/turns off the reflection light source 215 or the transmission light source section 318, generates an image data by photoelectrically converting the light focused on the pickup device 217.

The scanner device 100 may store the generated image data into any memory medium or may transmit the generated image data to an external device such as a personal computer via the communication I/F.

When reading a transmission type manuscript by the scanner device 100 provided with such a structure, user set the film holder 240 on the manuscript table glass 212 and set a transmission type manuscript to a predetermined position guided by the film holder 240. Moreover, user detaches the protection mat 323 from the TPU housing 230 before or after the set of the transmission type manuscript.

Then, as shown in FIG. 1 or 2, The TPU unit 120 is made to be opposed to the main body unit 110. Herewith, the gear 310 and the gear 313 of the coupling mechanism 309 are engaged to each other and the pickup device moving mechanism 223 and light source moving mechanism 323 are coupled.

Then, user performs command operation for reading the image of the transmission type manuscript. The command operation may be performed via the operation panel equipped in the scanner device 100 or may be performed by an external device such as a computer.

When a command operation for reading the image of the transmission type manuscript is requested, the scanner device 100 detects the amount of light received by the pickup device 217 while driving the motor 222 to move the scanner carriage 220 and the transmission light source section 318 along the sub scanning direction. Then, the scanner device 100 generates image data based on the detected received light amount.

Note that, before generating the image data, various standard data which become the standard of black color and white cooler of the image data may be obtained to perform a shading correction of the image data by using the obtained standard data. Obtaining the standard data and performing the shading correction using the obtained standard data are known art. Accordingly, the descriptions thereof are omitted here.

As described above, according to the scanner device 100 of the first embodiment, the power consumption of the motor 222 can be reduced to the minimum necessary without any special operation performed by user while allowing downsizing of the scanner device 100. That is, by providing the driving source of the light source moving mechanism 323 and the pickup device moving mechanism 223 by the single motor 222, the scanner device 100 can be downsized as compared with the case where motors are respectively independently provided for the light source moving mechanism 323 and the pickup device moving mechanism 223.

Further, the driving force transmitted to the light source moving mechanism 323 is blocked only when the protection mat 323 is attached for scanning a reflection type manuscript, so that the power consumption of the motor 222 can be reduced to the minimum necessary. In addition, the attachment of the protection mat 232 is the operation which must be performed by user in order to scan a reflection type manuscript. Accordingly, user can block the coupling without performing any special operation for blocking the coupling between the light source moving mechanism 323 and the pickup device moving mechanism 223. Accordingly, the power consumption of the motor 222 can be reduced to the minimum necessary without sacrificing the convenience of the user.

Further, the driving force is transmitted to the light source moving mechanism 323 only when the protection mat 232 is detached in order to scan a transmission type manuscript, so that the load applied to the motor 222 can be reduced to the minimum necessary. Accordingly, as compare with the case where the driving force is transmitted to the light source moving mechanism 323 also when scanning a reflection type manuscript, the durability of the scanner device 100 can be improved.

Second Embodiment

Next, a preferable second embodiment of the image reading device according to the invention will be described in detail with reference to the accompanying drawings. The second embodiment shows an example applied to the scanner device 100 providing the image reading device according to the invention. In the second embodiment, the same reference numeral is used to denote the same element in the above described first embodiment and description thereof will be omitted.

Figure 11:
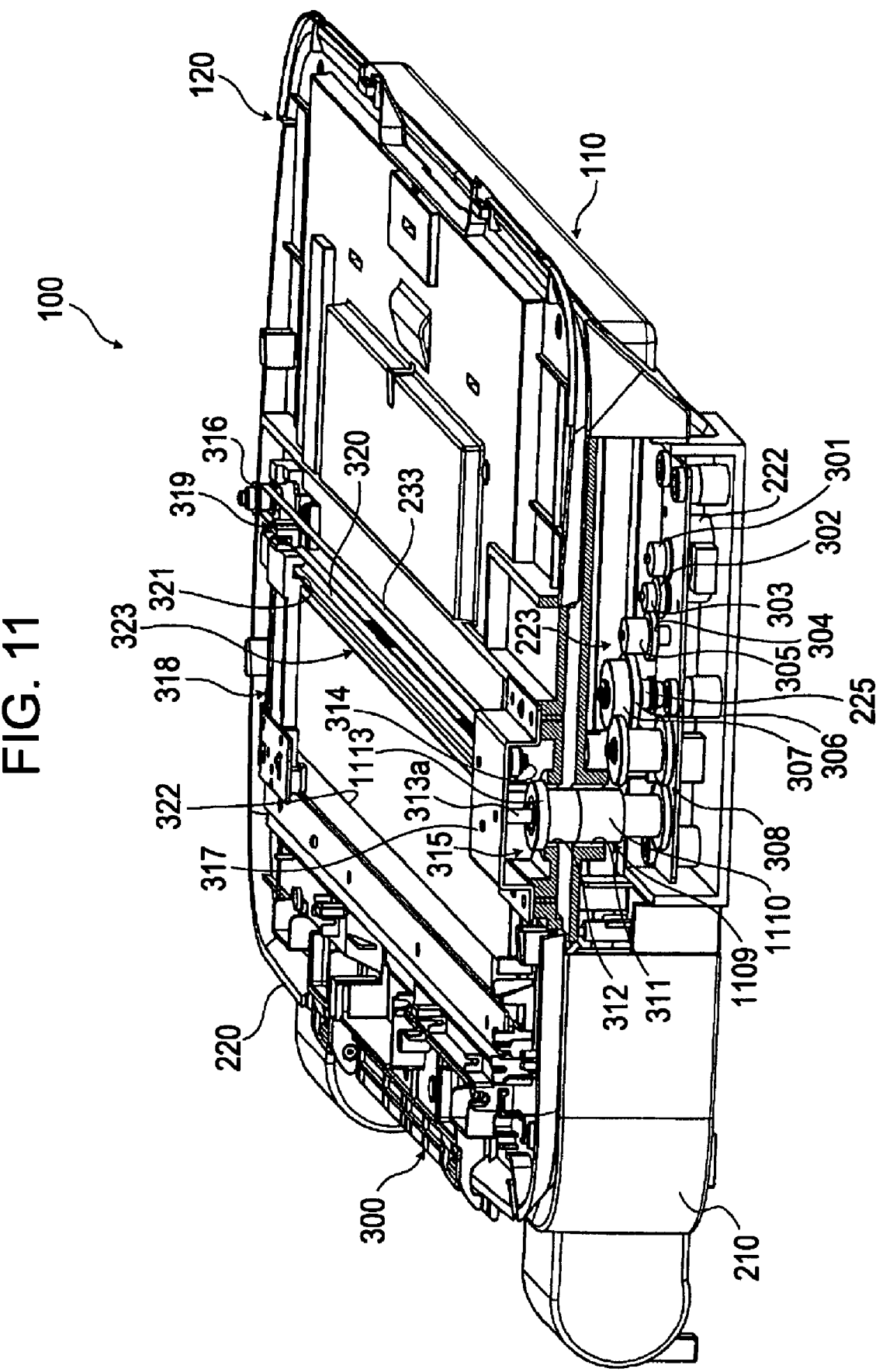
FIG. 11 is a perspective view, partially cross sectional view, showing a scanner device according to a second embodiment.

FIG. 11 is a perspective view, part of which is a cross sectional view, showing the scanner device 100 according to the second embodiment. In FIG. 11, a part of the TPU housing 230 and the main body housing 210 is shown in a cross sectional manner. Hereinafter, each element to which the driving force of the motor 222 is transmitted will be described.

As shown in FIG. 11, a magnetic body 1110 constituting a part of the coupling mechanism 309 is coupled to the pulley 307 via the plurality of pulley groups 308. The magnetic body 1110 rotates around the axis center parallel to the direction of the axes center of the pulley groups 308.

The magnetic body 1110 is oppositely disposed to a magnetic body 1113 provided at the side of the TPU unit 120 via the openings 311, 312 opened toward the side of the TPU unit 120 on the upper surface of the main body housing 210. Here, a coupling mechanism 1109 is constituted by the pulley 307, the pulley groups 308, the magnetic body 1110, the openings 311 and 312, and magnetic body 1110. The magnetic body 1113 is slidably provided with respect to the axis 313a and is rotatable around the axis center parallel to the axis center of the magnetic body 1110.

Herewith, the magnetic body 1113 is always made contact with the magnetic body 1110 when the TPU unit 120 is lowered to the main body unit 1110 and there is no blocking member 232a between the magnetic body 1110 and the magnetic body 1113.

Note that the magnetic body 1113 is prevented from escaping from the axis 313a to the side of the stay 317 by the stay 317. On the other hand, the magnetic body 1113 is constituted so as not to escape from the axis 313a to the side of the magnetic body 1110 by an escape preventing mechanism not shown when the main body unit 1110 and the TPU unit 120 are separated.

The magnetic bodies 1110 and 1113 constituting the coupling mechanism 1109 may both have magnetic force for attracting each other. Alternatively, at least one of the magnetic bodies 1110 and 1113 may have magnetic force for attracting the other one. When one of the magnetic bodies 1110 and 1113 has magnetic force, the other one is formed by a material such as, for example, iron having a property to be attracted by magnetic force.

The coupling mechanism 1109 has a torque limiter function which prevents to transmit a torque not less than a predetermined magnitude to the pulley group 315 by generating slipping between the magnetic body 1110 and the magnetic body 1113 when the torque transmitted from the pickup device moving mechanism 223 is larger than the predetermined magnitude. Herein, the torque having a predetermined magnitude refers to a torque necessary for moving the transmission light source section 318.

By the torque limiter function of the coupling mechanism 1109, each element related to the movement of the transmission light source section 318 such as the transmission light source section 318, the pulley group 315, or the pair of gear around which the driving belt 233 is wound can be prevented from damage even when a torque not less than a predetermined magnitude is transmitted.

Figure 12:
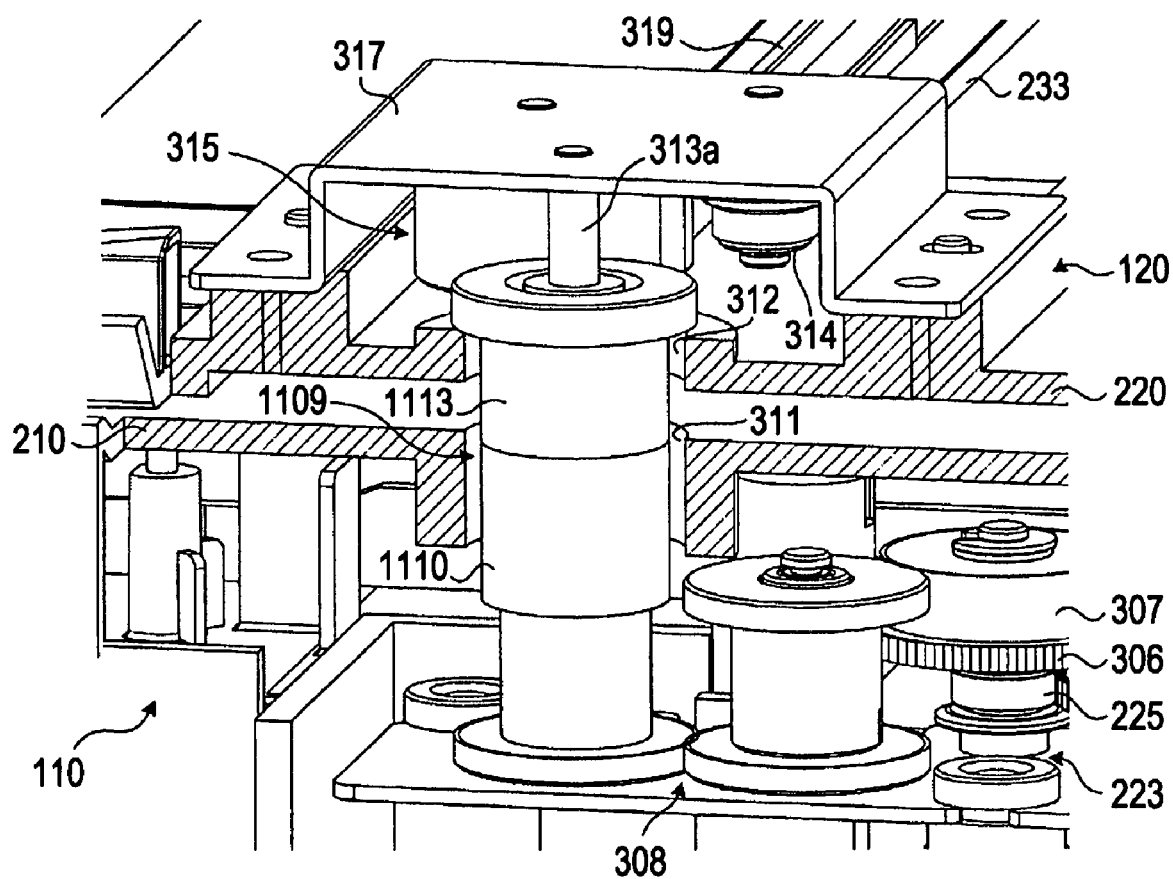
FIG. 12 is an enlarged perspective view (No. 1) showing a coupling mechanism.
Figure 13:
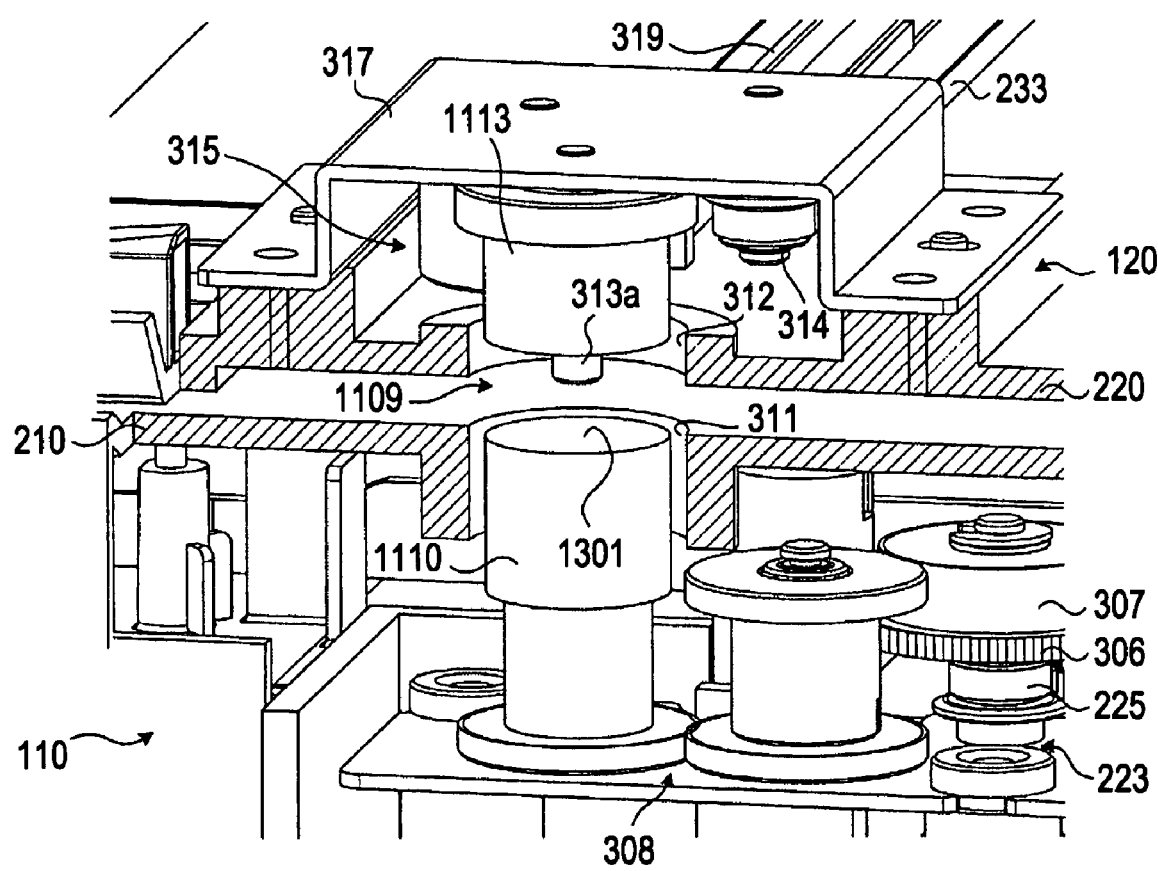
FIG. 13 is an enlarged perspective view (No. 2) showing the coupling mechanism.

FIG. 12 is an enlarged perspective view (No. 1) showing the coupling mechanism and FIG. 13 is an enlarged perspective view (No. 2) showing the coupling mechanism. FIG. 12 shows a state where the magnetic body 1110 and the magnetic body 1113 are coupled by magnetic force. FIG. 13 shows a state where the magnetic body 1110 and the magnetic body 1113 are separated. Note that, the magnetic body 1113 is essentially pulled by magnetic force to be made contact with the magnetic body 1110. However, the magnetic body 1110 and the magnetic body 1113 are separated in FIG. 13 for the sake of convenience of description.

As is understood from FIGS. 12 and 13, the magnetic body 1113 of the coupling mechanism 1109 is coupled to the magnetic body 1110 when separated from the stay 317 and separated from the magnetic body 1110 when positioned near the stay 317. The surfaces of the magnetic bodies 1110 and 1113 opposing each other shall be planes (see reference numeral 1301). Herewith, the wide surface for affecting attracting force can be assured to surly couple the magnetic body 1110 and the magnetic body 1113.

Figure 14:
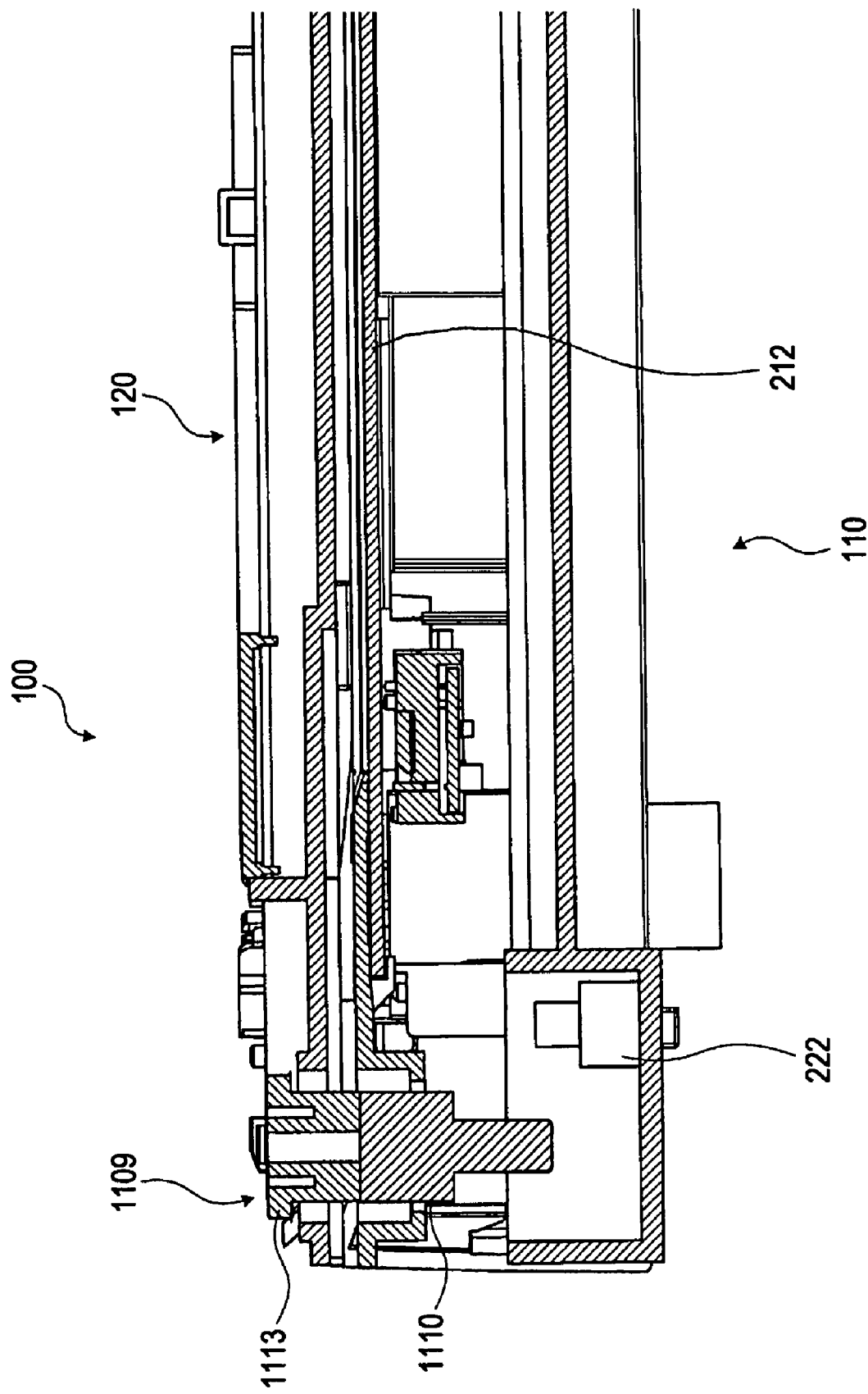
FIG. 14 is an enlarged longitudinal front view showing the scanner device when the protection mat is detached.
Figure 15:
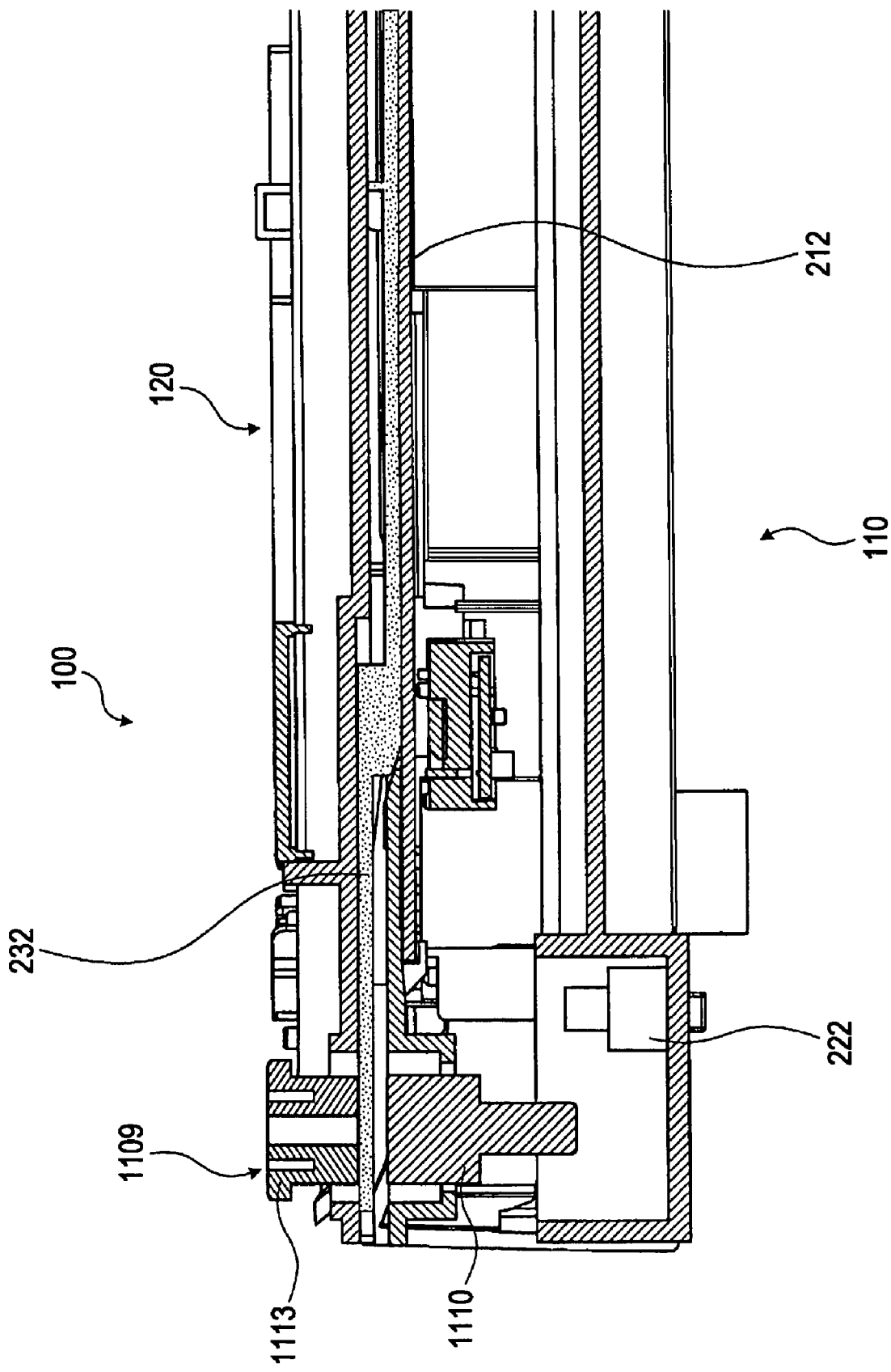
FIG. 15 is an enlarged longitudinal front view showing the scanner device when the protection mat is attached.

FIG. 14 is an enlarged longitudinal front view showing the scanner device 100 when the protection mat 232 is detached. FIG. 15 is an enlarged longitudinal front view showing the scanner device 100 when the protection mat is attached. FIGS. 14 and 15 show a state where the TPU unit 120 is lowered to the main body unit 110. As is understood from FIG. 12, the gear 313 constituting the coupling mechanism 309 is exposed from the TPU housing 230 when the protection mat 232 is detached from the TPU housing 230. When the TPU unit 120 is lowered to the main body unit 110 in this state, the magnetic body 1110 and the magnetic body 1113 are coupled and the driving force of the motor 222 is transmitted to the light source moving mechanism 323.

On the other hand, as is understood from FIG. 15, when the protection mat 232 is attached to the TPU housing 230, the magnetic body 1113 constituting the coupling mechanism 309 is covered over by the TPU housing 230. When the TPU unit 120 is lowered to the main body unit 1110 in this state, the magnetic body 1110 and the magnetic body 1113 are not coupled and the driving force of the motor 222 is not transmitted to the light source moving mechanism 323.

As described above, according to the scanner device 100 of the second embodiment, the power consumption of the motor 222 can be reduced to the minimum necessary without any special operation performed by user while allowing downsizing of the scanner device 100 similarly to the first embodiment. That is, by providing the driving source of the light source moving mechanism 323 and the pickup device moving mechanism 223 by one motor 222, the scanner device 100 can be downsized as compared with the case where motors are respectively independently provided for the light source moving mechanism 323 and the pickup device moving mechanism 223.

Further, the driving force is transmitted to the light source moving mechanism 323 only when the protection mat 232 is detached for scanning the transmission type manuscript, so that the power consumption of the motor 222 can be reduced to the minimum necessary. In addition, the detachment of the protection mat 232 is the operation which must be performed by user in order to scan a transmission type manuscript. Accordingly, user is not required for performing any special operation for blocking the coupling of the light source moving mechanism 323 and the pickup device moving mechanism 223. Accordingly, the power consumption of the motor 222 can be reduced to the minimum necessary without sacrificing the convenience of the user.

Further, the driving force is transmitted to the light source moving mechanism 323 only when the protection mat 232 is detached for scanning a transmission type manuscript, so that the load applied to the motor 222 can be reduced to the minimum necessary. Accordingly, as compare with the case where the driving force is transmitted to the light source moving mechanism 323 also when scanning a reflection type manuscript, the durability of the motor 222 of the scanner device 100 can be improved.

Further, by the torque limiter function of the coupling mechanism 1109, each element related to the movement of the transmission light source section 318 such as the transmission light source section 318, the pulley group 315, or the pair of gear around which the driving belt 233 is wound can be prevented from damage even when a torque not less than a predetermined magnitude is transmitted. Accordingly, the durability of the each element related to the movement of the transmission light source section 318 of the scanner device 100 can be improved.

Third Embodiment

Next, a preferable third embodiment of a multifunction machine according to the invention will be described in detail with reference to the accompanying drawings. The third embodiment shows an example applied to the multifunction machine providing the image reading device and image forming device according to the invention. In the third embodiment, the same reference numeral is used to denote the same element as that in the first and the second embodiment and description thereof will be omitted.

Figure 16:
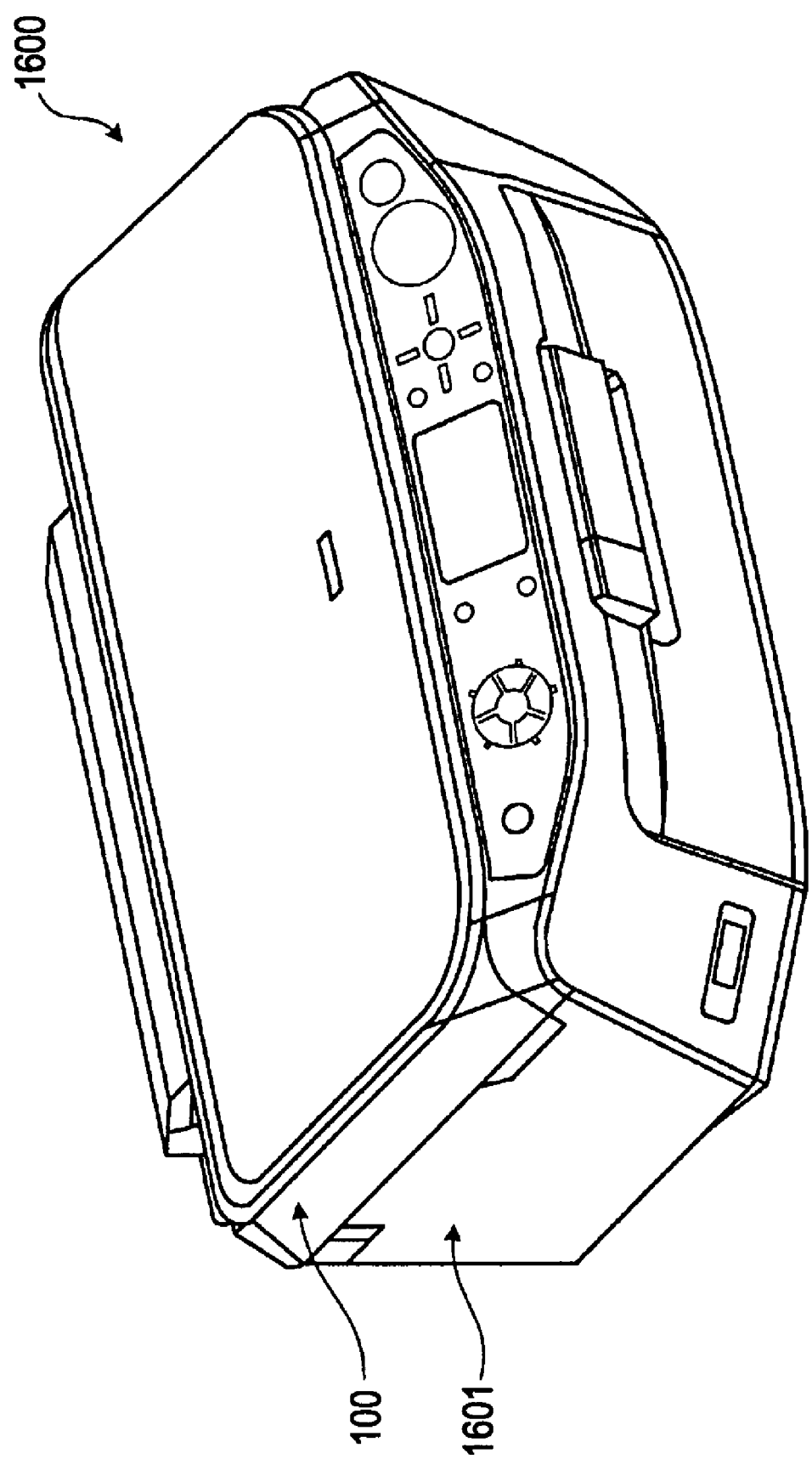
FIG. 16 is a perspective view showing an appearance of a multifunction machine according to a third embodiment.

FIG. 16 is a perspective view showing an appearance of a multifunction machine according to a third embodiment. The multifunction machine 1600 according to the third embodiment includes the scanner device 100 described in the above first and second embodiments and a printer 1601 as an image forming device for forming an image on a recording medium according to the intensity of the light introduced into the pickup device 217 equipped in the scanner device 100.

The scanner device 100 and the printer 1601 are connected so as to be able to be communicated with each other via a communication I/F not shown. The scanner device 100 outputs image data corresponding to the intensity of the light introduced into the pickup device 217 to the printer 100.

The printer 1601 is equipped with a printer engine for forming an image on a recording medium such as a paper. Though the drawing and description are omitted because of the known art, various systems such as, for example, an ink jet system, an electrostatic transfer system, a sublimation transfer system can be applied to the image forming system of the printer engine.

The printer 1601 forms an image on a recording medium such as a paper based on the image data output from the scanner device 100 in the multifunction machine 1600 equipped with such a structure.

According to the multifunction machine 1600, regardless of the type of manuscript, an image based on the image data recreated from a manuscript image in high definition can be formed on a recording medium such as a paper. In addition, regardless of the type of manuscript, this enables user to obtain a recording medium on which the image based on the imaged data recreated from a manuscript image in high definition is formed.

What is claimed is:

1. An image reading device equipped with a first light source provided at the same side of a pickup device with respect to a manuscript table and a second light source provided at the opposite side of the pickup device with respect to the manuscript table, the image reading device comprising:
    a light shielding member provided at a first position at which light introduced to the manuscript table from the second light source is shielded or a second position different from the first position in a selectable manner;
    a coupling mechanism for coupling a light source moving mechanism for moving the second light source and a pickup device moving mechanism for moving the pickup device so as to be able to be engaged by a single driving source; and
    a blocking member provided to the light shielding member so as to block the coupling provided by the coupling mechanism when the light shielding member is provided at the first position.

2. The image reading device according to claim 1, further comprising a cover member, the cover member having a shape to shield outside light introduced into the pickup device through the manuscript table, which can freely contact with and separate from the manuscript-table, wherein
    the light shielding member is provided so as to be freely attached to and detached from the cover member.

3. The image reading device according to claim 2, wherein the blocking member is provided to the light shielding member at a position which allows blocking the coupling provided by the coupling mechanism when the light shielding member is attached to the cover member.

4. The image reading device according to claim 2, wherein the blocking member has a shape to press a portion of the coupling mechanism projected from the cover member into the cover member when the light shielding member is attached to the cover member.

5. The image reading device according to claim 1, wherein the light shielding member has a shape to hold down a manuscript to the manuscript table.

6. The image reading device according to claim 1, wherein the second light source is provided to the cover member.

7. The image reading device according to claim 1, wherein the second light source is constituted by an LED.

8. A multifunction machine, comprising:
    the image reading device according to claim 1; and
    an image forming device for forming an image on a recording medium according to intensity of light introduced into the pickup device equipped in the image reading device.

* * * * *